(12) United States Patent
Poris et al.

(10) Patent No.: US 7,173,417 B1
(45) Date of Patent: Feb. 6, 2007

(54) EDDY CURRENT SENSOR WITH CONCENTRIC CONFOCAL DISTANCE SENSOR

(75) Inventors: Jaime Poris, Boulder Creek, CA (US); Claudio L. Rampoldi, Mountain View, CA (US); Pablo I. Rovira, San Francisco, CA (US); Christopher W. Blaufus, San Jose, CA (US)

(73) Assignee: Nanometrics Incorporated, Milpitas, CA (US)

( * ) Notice: Subject to any disclaimer, the term of this patent is extended or adjusted under 35 U.S.C. 154(b) by 291 days.

(21) Appl. No.: 10/402,661

(22) Filed: Mar. 28, 2003

(51) Int. Cl.
*G01B 7/06* (2006.01)
*G01R 33/02* (2006.01)

(52) U.S. Cl. .................... 324/230; 324/244.1
(58) Field of Classification Search ................ 324/230, 324/662, 234, 229, 244.1
See application file for complete search history.

(56) References Cited

U.S. PATENT DOCUMENTS

| | | | |
|---|---|---|---|
| 4,849,694 A | 7/1989 | Coates | 324/230 |
| 4,937,618 A * | 6/1990 | Ayata et al. | 355/43 |
| 5,483,055 A * | 1/1996 | Thompson et al. | 250/201.3 |
| 5,525,903 A | 6/1996 | Mandl et al. | 324/230 |
| 5,557,452 A * | 9/1996 | Harris | 359/368 |
| 5,785,651 A * | 7/1998 | Kuhn et al. | 600/310 |
| 5,894,132 A * | 4/1999 | Nakasuji et al. | 250/492.22 |
| 6,281,679 B1 | 8/2001 | King et al. | 324/229 |
| 6,373,978 B1 * | 4/2002 | Ishihara | 382/154 |
| 6,407,546 B1 | 6/2002 | Le et al. | 324/230 |
| 6,433,541 B1 | 8/2002 | Lehman et al. | 324/230 |
| 6,441,359 B1 * | 8/2002 | Cozier et al. | 250/216 |
| 6,563,308 B2 * | 5/2003 | Nagano et al. | 324/230 |
| 6,593,738 B2 | 7/2003 | Kesil et al. | 324/230 |
| 6,608,495 B2 * | 8/2003 | Sarfaty et al. | 324/752 |
| 6,657,216 B1 * | 12/2003 | Poris | 250/559.22 |
| 6,700,370 B2 | 3/2004 | Chen et al. | 324/230 |
| 6,815,947 B2 | 11/2004 | Scheiner et al. | 324/230 |
| 2002/0053904 A1 | 5/2002 | Chen et al. | 324/230 |
| 2002/0063221 A1 * | 5/2002 | Li | 250/491.1 |
| 2003/0090266 A1 | 5/2003 | Kesil et al. | 324/230 |
| 2004/0070393 A1 | 4/2004 | Sarfaty et al. | 324/230 |

FOREIGN PATENT DOCUMENTS

WO     WO 9311427 A1 *  6/1993

OTHER PUBLICATIONS

"Eddy Current Theory—Testing", http://www.hocking.com/theory_testing.htm, downloaded Mar. 6, 2003, 9 pages.

* cited by examiner

*Primary Examiner*—Edward Lefkowitz
*Assistant Examiner*—David M. Schindler
(74) *Attorney, Agent, or Firm*—Silicon Valley Patent Group LLP

(57) ABSTRACT

A metrology instrument includes an eddy current sensor that is mounted to and concentric with a confocal distance sensor. By measuring the precise vertical placement of the eddy current probe with respect to the surface of the sample using the confocal distance sensor, the accuracy and precision of the eddy current measurement is improved. Because the confocal distance sensor and the eddy current sensor are confocal, there is no need to move the relative lateral positions between the sample and instrument, between the distance measurement and the eddy current measurement, thereby reducing error in the measurement as well are maximizing the throughput by minimizing the required stage travel for a single measurement.

10 Claims, 2 Drawing Sheets

EDDY CURRENT SENSOR WITH CONCENTRIC CONFOCAL DISTANCE SENSOR

FIELD OF THE INVENTION

The present invention relates to metrology and in particular to metrology using an eddy current probe.

BACKGROUND

As is known in the art, eddy current measurement techniques involve passing an alternating current through a coil which induces eddy currents in an adjacent conductive sample. The closed loop induced currents run perpendicular to the magnetic flux of the exciting coil (typically the current runs parallel to the coil windings). The conductive components of the sample modify the response of the electrical circuit and allow the resistance of the sample to be determined. The depth of the conductive material that is sensed is related to the frequency utilized to excite the coil. Two coils are often used in eddy current measurement, one coil for inducing eddy currents and another coil for sensing the change in electrical response. Such an eddy current instrument, and eddy current metrology in general, is discussed in detail in U.S. Pat. No. 4,849,694 entitled "Thickness Measurements of Thin Conductive Films" by Vincent J. Coates, issued Jul. 18, 1989, which is incorporated herein by reference. Alternatively, a single coil can be used for both inducing the eddy currents and sensing a change in the electrical response.

An eddy current sensor is commonly used to measure properties associated with conductive samples. For example, the sheet resistance associated with a thin metallic film ($R_f$) can be measured with an eddy current metrology tool. With a knowledge of the resistivity ($\rho$) of the thin film material, the resistance measurement can be converted to a thickness measurement. The following formula relates the measured sheet resistance to the thickness (x) for a thin film:

$$R_f = \frac{\rho}{x}. \qquad \text{Eq. 1}$$

Measuring the resistance and thickness of thin films is very important in the semiconductor and magnetic head industries to ensure proper process control. Eddy current measurements can also be employed to characterize the magnetic properties of samples or detect the presence of defects or voids in conductive samples.

In some applications it is desirable to use an eddy current tool to measure the resistance and/or thickness of a conductive thin film that is deposited onto a substrate that already has an appreciable conductivity. If this "background" conductivity is ignored, the eddy current measurement will incur significant error. To minimize the error associated with the conductivity of the substrate, an eddy current measurement is first made before the thin film is deposited onto the sample. The resistance associated with the substrate is called $R_s$. Next, the film is deposited onto the substrate. A second eddy current measurement is made at the same location measuring the total resistance associated with the thin film plus the substrate. This resistance is called $R_t$. The resistance associated with the thin film ($R_f$) is calculated using the following formula:

$$R_f = \frac{1}{\frac{1}{R_t} - \frac{1}{R_s}}. \qquad \text{Eq. 2}$$

It may also be possible to measure the resistance associated with a thin film on a conductive substrate only after deposition by making multiple measurements at different excitation frequencies. The excitation frequency (f) associated with an eddy current measurement affects the penetration depth of the eddy currents into the sample. This penetration depth is known as the skin effect. The formula for the approximate skin depth ($\delta$) (in microns) for copper is as follows:

$$\delta = \frac{66,000}{\sqrt{f}} \qquad \text{Eq. 3}$$

The higher the frequency, the shallower the eddy currents penetrate the sample. By measuring the resistance of the substrate plus thin film at different frequencies (skin depths), the resistance contribution from just the thin film can be mathematically extracted. The excitation frequencies must also be chosen so that the skin depths are optimized for the thickness of the thin film and the depth of the conductive components of the substrate. For example, a frequency of 100 MHz must be used for a skin depth of approximately 6.6 microns of copper. The obvious advantage of this technique is that a pre-deposition measurement will not need to be made improving the throughput of the metrology tool. If the eddy current tool is being used in an integrated configuration (the metrology module is integrated into a process tool) the enhanced throughput of this procedure is advantageous.

Conventionally, the eddy current metrology probe is located above a flat substrate sample to be measured. It is desirable to place the probe a fixed distance above the sample, as varying this distance will introduce errors to the measured resistance value, especially at high excitation frequencies. As discussed in U.S. Pat. No. 4,849,694, it is desirable to place the measurement probe that measures the distance from the surface, e.g., a microscope, in close proximity to the eddy current sensor to ensure that the distance of the eddy current sensor from the surface is not subject to the variation of the height of the surface over small distances.

FIG. 1 shows a conventional eddy current metrology tool 10 that includes a coil 12 mounted to a microscope objective lens 16. In general, the focusing capability of the microscope objective lens 16 is used to determine and set the eddy current sensor a fixed distance above the sample.

As shown in FIG. 1, there is a distance D (which may be 10 mm) between the measurement location of the microscope objective lens 16 and the center of the eddy current coil 12. Accordingly, if a polar coordinate type stage is used with metrology tool 10, not every location on the sample 18 will be able to be measured unless extra linear travel (10 mm in this example) is incorporated into the r axis. This extra linear travel will increase the footprint of the stage. In addition, metrology tool 10 requires that the sample 18 (or the metrology tool 10) be moved during the measurement process. After focusing the microscope objective lens 16 on the surface of the sample 18, the sample 18, or metrology instrument 10, must be moved to position the desired measurement location under the eddy current sensor. If the metrology instrument 10 (or sample 18) is not moved, the eddy current sensor may measure a location on the sample 18 that is at a different height than measured by the microscope objective lens 16, as illustrated in FIG. 1. This could be a result of topographic features on the sample or a result of tilting of the sample surface with respect to the optical axis of the metrology tool. Therefore, the sample 18 or metrology tool 10 must be moved to prevent a loss of accuracy. Accordingly, an improved eddy current metrology device that does not require sample or instrument movement with no loss of accuracy or degradation of throughput is desired.

SUMMARY

In accordance with an embodiment of the present invention, a metrology instrument includes an eddy current sensor that is mounted to and concentric with a confocal distance sensor. By measuring the precise vertical placement of the eddy current probe with respect to the surface of the sample using the confocal distance sensor, the accuracy and precision of the eddy current measurement is improved. Because the confocal distance sensor and the eddy current sensor are confocal, there is no need to move the relative lateral positions between the sample and instrument, between the distance measurement and the eddy current measurement, thereby reducing error in the measurement as well are maximizing the throughput by minimizing the required stage travel for a single measurement.

According to one embodiment, a metrology apparatus includes a confocal distance sensor having an objective lens and an eddy current sensor coupled to the confocal distance sensor. The confocal distance sensor measures the distance between a sample and the objective lens at a measurement location on the sample. The eddy current sensor is coupled to the confocal distance sensor such that the eddy current sensor measures the sample at a location that is concentric with the measurement location of the distance sensor.

According to another embodiment of the present invention, a method of measuring a parameter of a sample includes producing light that passes through an objective lens and is incident on a location on the sample. The light is reflected from the sample and received by a detector. The method includes varying the distance between the sample and the objective lens, wherein different distances between the sample and the objective lens are associated with intensity measurements from the detector. The distance between the sample and the objective lens is determined by determining the maximum intensity of the reflected light for the different distances. The method further includes measuring the eddy current at the location on the sample, wherein the distance measurement and the eddy current measurement are approximately concentric.

DETAILED DESCRIPTION

Figure 2:
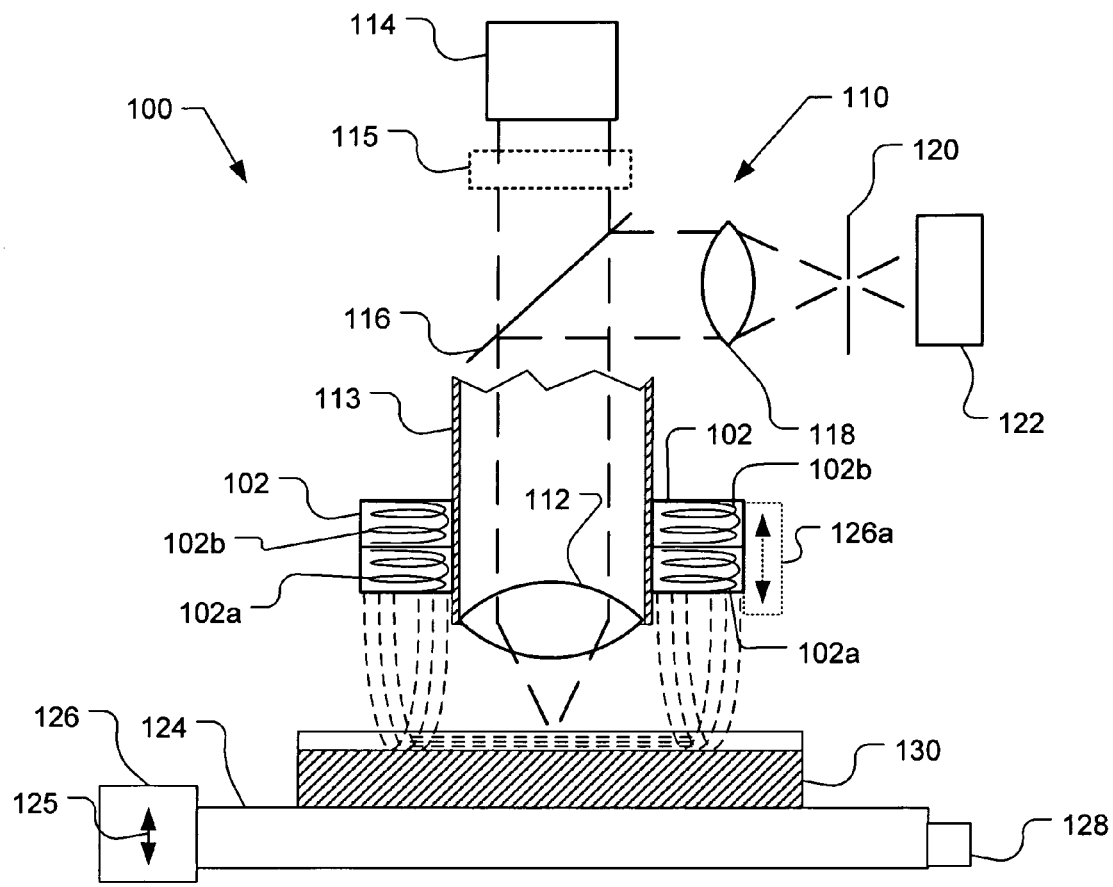
FIG. 2 is a cross-sectional view of a metrology tool, in which a confocal distance sensor and an eddy current sensor are coupled and concentric.
Figure 3:
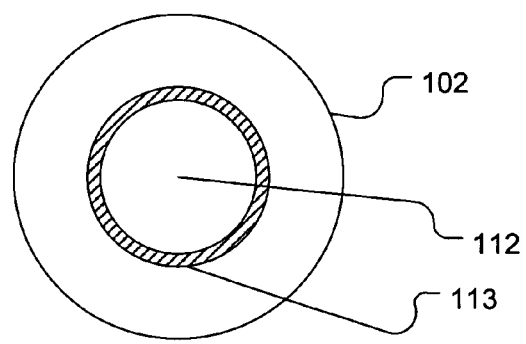
FIG. 3 is a top plan view showing the eddy current sensor of FIG. 2 concentric with the objective lens used with the distance sensor.

FIG. 2 is a cross-sectional view of a metrology tool 100, in which a confocal distance sensor 110 and the eddy current sensor 102 that are coupled together and have concentric measurement areas. FIG. 3 is a top plan view showing the eddy current sensor 102 that is concentric with the objective lens 112 used with the confocal distance sensor 110. Accordingly, the inner diameter of the eddy current sensor 102 is slightly larger than the diameter of the objective lens 112. Thus, the diameter of the objective lens 112 must be compatible with the desired diameter of the eddy current sensor 102. In one embodiment, the eddy current sensor 102 has an inner coil diameter of 4 mm, and the objective lens 112 has a diameter of 3 mm, while the tube 113 that holds the objective lens 112 has a wall thickness of 0.5 mm.

Confocal distance sensor 110 includes a light source 114, such as a laser, light emitting diodes, or a broadband light source, that produces a beam of light that is focused by objective lens 112 onto the surface of sample 130. The beam strikes the surface of sample 130 at approximately normal incidence.

After reflection from the surface of the sample 130 and transmission back through objective lens 112, a fraction of the beam is reflected by beamsplitter 116 toward detector 122. Between detector 122 and beamsplitter 116 are a detector lens 118 and a pinhole 120. The focal plane of the objective lens 112 and the focal plane of the detector lens 118, which is the plane of the pinhole 120, are made to be confocal.

The stage 124 is moved orthogonally with respect to the plane of the sample 130, i.e., in the z direction indicated by arrow 125, over a range exceeding the expected step size on the surface, thickness variation and warpage of the sample 130. The movement of stage 124 in the z direction may be accomplished using a driver 126, which may be a piezoelectric, voice coil driver or other appropriate driver well known in the art. An encoder 128 associated with z motion of the stage 124 allows the determination of the position of the sample 130, via stage 124, to the objective lens 112 at any given time. Each position is associated with an amplitude response from the detector 122.

In another embodiment, the objective lens 112 and eddy current sensor 102 are moved with respect to the stage 124, again using an appropriate driver 126a, such as a piezoelectric or voice coil driver, and again the distance between the sample 130, via stage 124 and the objective lens 112 is associated with an amplitude response from the detector 122.

Figure 1:
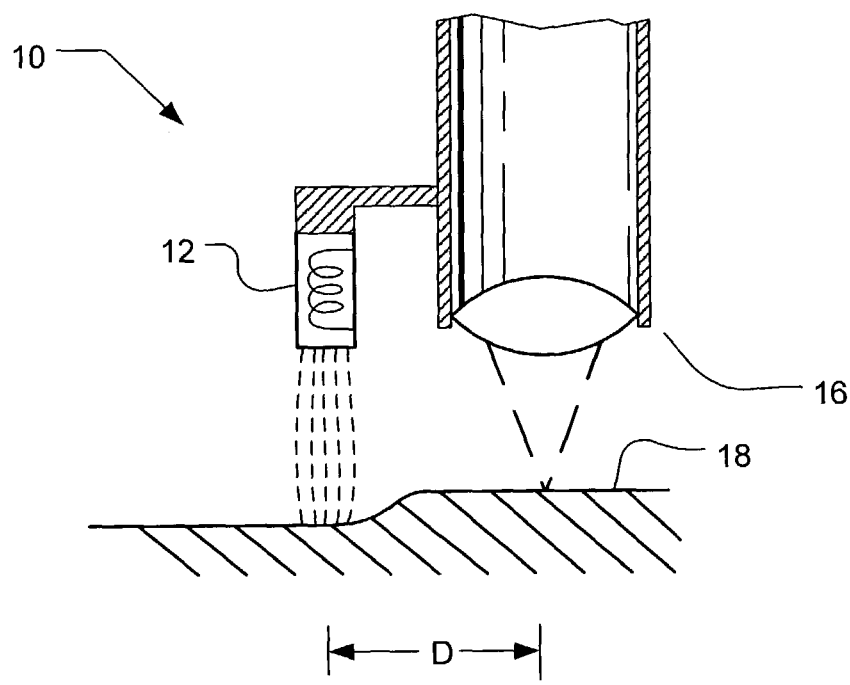
FIG. 1 shows a conventional eddy current metrology tool that includes an eddy current coil mounted to a microscope objective lens.
Figure 4:
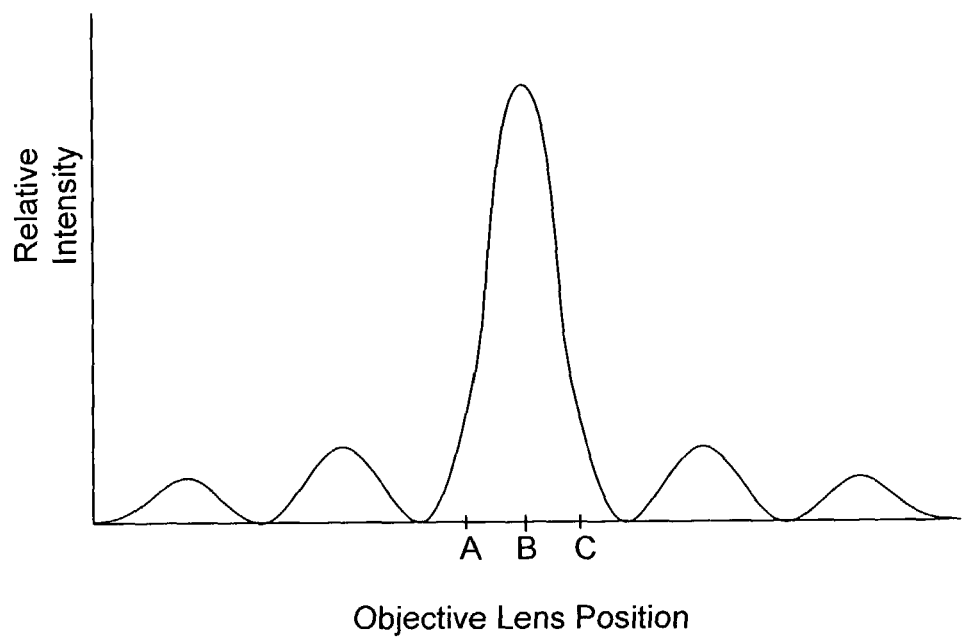
FIG. 4 shows a typical plot showing the distance between the objective lens and the sample along the horizontal axis and the measured detector signal intensity along the vertical axis.

FIG. 4 shows a typical plot showing the distance between the objective lens 112 and the sample 130, via stage 124, along the horizontal axis and the measured detector signal intensity along the vertical axis. The detector signal reaches a maximum when the beam is focused on the sample surface (and the pinhole) shown in FIG. 4 as position B. The detector signal falls off when the focal plane of the objective lens 112 is above or below the sample surface, shown as positions A and C in FIG. 4.

To make a measurement at one point on the surface of the sample 130, as shown in FIG. 2, the intensity measured by the detector 122 is recorded along with the distance between the objective lens 112 and the sample 130. The position of the lens 112 at the maximum detector intensity is determined and yields the relative height of the surface of the sample 130 at that measurement position. The eddy current sensor 102 may then be used at this height position or another preferred position may be used to improve the signal to noise ratio of the eddy current sensor and/or decrease the effective eddy current spot size.

A single wavelength diode or laser source can be used as light source 114, but may exhibit an undesirably small amount of reflection from specific dielectric stacks. White light will produce a large amount of reflection, but may exhibit less precision if chromatic aberrations are not minimized in the system. A narrow wavelength range (for example 500 to 540 nm) of light is a good compromise to use in a confocal sensor, because it minimizes chromatic aberrations and typically exhibits adequate reflection from almost all types of dielectric stacks. In one embodiment, this is accomplished using a broadband light source 114 and including a bandpass filter 115 at the desired full width half maximum (FWHM) value. Multiple, concentric light emitting diodes at different wavelengths can also be used as light source 114 without the need for filtration.

In one embodiment, the eddy current sensor 102 may include two eddy current coils 102a and 102b, one coil for inducing eddy currents and another coil for sensing the change in electrical response, which are mounted concentric to the objective lens with one on top of the other. In this embodiment, the measurement location of the objective lens 112 and the measurement location of the eddy current coils are concentric. In another embodiment, eddy current sensor 102 may include only one coil, e.g., coil 102a.

To make an eddy current measurement on a sample 130, the eddy current sensor 102 is placed a fixed distance above the sample 130 using the confocal distance sensor 110 after focusing. The distance may be identical to the focusing distance of confocal distance sensor 110 or another value. For example, the focusing distance of the distance sensor may be 2 mm while the eddy current sensor is preferably placed 1 mm from the surface. A superior signal to noise ratio is achieved when the sensor is closer to the sample surface. The effective spot size is also decreased with a smaller sensor to sample distance. Because the eddy current sensor 102 is coupled to the objective lens 112, the eddy current sensor 102 can be consistently placed above the sample at the same height. The eddy currents are then excited in the conductive sample 130 at a chosen frequency. Because the eddy current sensor 102 and the objective lens 112 are concentric, there is no need to move the sample 130 (or metrology instrument 100) between measuring the height with confocal distance sensor 110 and performing the eddy current measurement. In one embodiment, the height of the eddy current sensor 102 may be adjusted prior to performing the eddy current measurement. The area of measurement on the sample 130 is roughly comparable to the diameter of the exciting coil in the eddy current sensor 102.

As discussed above, a variation in the distance from the eddy current sensor to the sample surface from one measurement location to the next can significantly affect the magnitude and phase of the response signal of the eddy current probe, thereby degrading the accuracy and precision of the measurement. By precisely and consistently placing the eddy current sensor 102 a fixed distance above the sample 130 at each measurement location, the effect of this error is limited in the measurement precision of metrology tool 100. The measurement precision of metrology tool 100 is thus predominantly limited by other factors unrelated to the distance between sensor and sample (such as the temperature of the thin film).

The concentric configuration of the eddy current sensor 102 with the confocal distance sensor 110 of metrology tool 100, advantageously, improves throughput. The vertical distance and eddy current measurements can be made without having to move the sample between two different locations. By measuring the vertical distance of the probe at the exact eddy current measurement location, there is no error related to thickness variations, warping or bowing of the substrate. Moreover, metrology tool 100 allows every position on the sample surface to be measured with a stage utilizing the minimum amount of linear travel, approximately one half of the substrate diameter. A few millimeters may be added to account for wafer eccentricity and loading errors. Accordingly, the stage may have a small footprint, while the throughput is improved by minimizing the amount of required stage travel to make a single measurement.

In addition, metrology tool 100 minimizes complications that result from measurements close to the edge of the sample. The eddy current sensor diameter determines the size of the edge exclusion. With a configuration in accordance with the present invention, any off the shelf eddy current sensor, with an appropriate diameter, can be used.

As is well known in the art, many techniques can be employed to measure the distance from a probe to the surface of a sample. The maximum contrast using a microscope, a laser displacement sensor, a confocal sensor and a knife edge sensor are some practical examples, and confocal distance sensor 110 may be any of these examples. Because a laser displacement sensor requires the beam to intercept the sample at an oblique angle, the eddy current sensor may interfere with the beam depending on the working distances involved.

A confocal sensor is particularly advantageous due to the simplicity of such a sensor and the use of an orthogonal measurement beam. The principles associated with a confocal microscope as used in conventional laser confocal displacement sensors are described in U.S. Pat. No. 3,013,467, which is incorporated herein by reference. The basic principal of the confocal displacement sensor involves rejecting a large fraction of the reflected light that is not in the focal plane of the surface of the sample, thereby increasing the contrast and resolution of the resultant image. One typical commercial version of a laser confocal displacement sensor is sold as the LT series by Keyence Corporation of America, located in Woodcliff Lake, N.J.

Although the present invention is illustrated in connection with specific embodiments for instructional purposes, the present invention is not limited thereto. Various adaptations and modifications may be made without departing from the scope of the invention. For example, different types of distance metrology instruments may be used as confocal distance sensor 110. Therefore, the spirit and scope of the appended claims should not be limited to the foregoing description.

What is claimed is:

1. A metrology apparatus comprising:
    a confocal distance sensor having an objective lens, said confocal distance sensor measures a distance between a sample and said objective lens at a measurement location on said sample; and
    an eddy current sensor coupled to said confocal distance sensor such that said eddy current sensor measures said sample at a location that is concentric with the measurement location of said distance sensor.

2. The metrology apparatus of claim 1, wherein said eddy current sensor surrounds said objective lens.

3. The metrology apparatus of claim 1, wherein said confocal distance sensor has a broadband light source that produces a beam of light.

4. The metrology apparatus of claim 3, wherein said confocal distance sensor has a bandpass filter that filters said beam of light.

5. The metrology apparatus of claim 1, further comprising a stage upon which said sample is held, said stage being movable in a plane orthogonal to a plane of said sample.

6. The metrology apparatus of claim 1, further comprising a means for moving at least a portion of said confocal distance sensor and said eddy current sensor in a plane orthogonal to a plane of said sample.

7. The metrology apparatus of claim 6, wherein said means for moving comprises at least one of a piezoelectric driver and a voice coil driver.

8. A method of measuring a parameter of a sample, said method comprising:
   producing light that passes through an objective lens and is incident over a first area on said sample, said light is reflected from said sample and received by a detector;
   varying a distance between said sample and said objective lens, wherein different distances between said sample and said objective lens are associated with intensity measurements from said detector;
   determining a maximum intensity of said light that is reflected from said sample to determine the distance between said sample and said objective lens; and
   performing an eddy current measurement over a second area on said sample, wherein said first area and said second area are approximately concentric.

9. The method of claim 8, wherein said first area is less than said second area.

10. The method of claim 8, wherein said eddy current measurement is performed with an eddy current sensor, the method further comprising adjusting a distance between said eddy current sensor and said sample after determining the distance between said sample and said objective lens and before performing said eddy current measurement.

* * * * *